(12) United States Patent
Chang

(10) Patent No.: US 10,683,062 B2
(45) Date of Patent: Jun. 16, 2020

(54) BOAT WITH A FOAM MATERIAL FILLED KEEL STRUCTURE

(71) Applicant: MLRB SDN. BHD, Sarawak (MY)

(72) Inventor: Ting-Wei Chang, New Taipei (TW)

(73) Assignee: MLRB SDN, BHD, Sarawak (MY)

( * ) Notice: Subject to any disclaimer, the term of this patent is extended or adjusted under 35 U.S.C. 154(b) by 0 days.

(21) Appl. No.: 16/125,088

(22) Filed: Sep. 7, 2018

(65) Prior Publication Data

US 2020/0079473 A1 Mar. 12, 2020

(51) Int. Cl.
| | | |
|---|---|---|
| *B63B 3/38* | (2006.01) | |
| *B63B 7/08* | (2020.01) | |
| *B63B 1/04* | (2006.01) | |
| *B63B 34/50* | (2020.01) | |
| *B29L 31/30* | (2006.01) | |
| *B63B 5/24* | (2006.01) | |

(52) U.S. Cl.
CPC .............. *B63B 3/38* (2013.01); *B63B 1/042* (2013.01); *B63B 7/08* (2013.01); *B63B 34/50* (2020.02); *B29L 2031/307* (2013.01); *B63B 2005/242* (2013.01)

(58) Field of Classification Search
CPC .. B63B 1/042; B63B 3/38; B63B 5/24; B63B 7/08; B63B 35/78; B63B 2003/38; B63B 2005/24; B63B 2005/242; B63B 2007/00; B63B 2007/06; B63B 2031/307; B63B 2043/042; B63B 2043/047; B63B 2207/00; B63B 2231/40; B63B 2231/50; B63B 2701/20; B63B 2735/00
USPC ..... 114/61.25, 61.32, 68, 69, 140, 271, 345, 114/355, 357, 360
See application file for complete search history.

(56) References Cited

U.S. PATENT DOCUMENTS

| | | | | |
|---|---|---|---|---|
| 3,291,088 A | * | 12/1966 | Klose .................. | B63B 35/71 114/39.25 |
| 3,599,257 A | * | 8/1971 | Erickson ............... | B63B 5/24 114/347 |
| 3,840,926 A | * | 10/1974 | Stoeberl ............... | B63B 5/24 114/357 |
| 6,250,983 B1 | * | 6/2001 | Paterson .............. | B63B 17/02 114/344 |
| 6,286,448 B1 | * | 9/2001 | Sahr .................... | B63B 5/24 114/357 |

\* cited by examiner

*Primary Examiner* — Daniel V Venne
(74) *Attorney, Agent, or Firm* — Pro-TECHTOR International Services; Ian Oglesby

(57) ABSTRACT

A boat with a foam material filled keel structure comprising: a buoyant body, which is a U-shaped tube; a bottom plate, set on the bottom of the buoyant body; a tail plate, set at the rear of the buoyant body and the bottom plate; and a keel structure, set on the bottom of the bottom plate; wherein the keel structure is downward depressed, hence a convex part on the bottom and a groove on the top are formed; wherein in the groove of the keel structure is filled with foam material, Thereby it is achieved that water seepage in the keel structure is avoided.

6 Claims, 5 Drawing Sheets

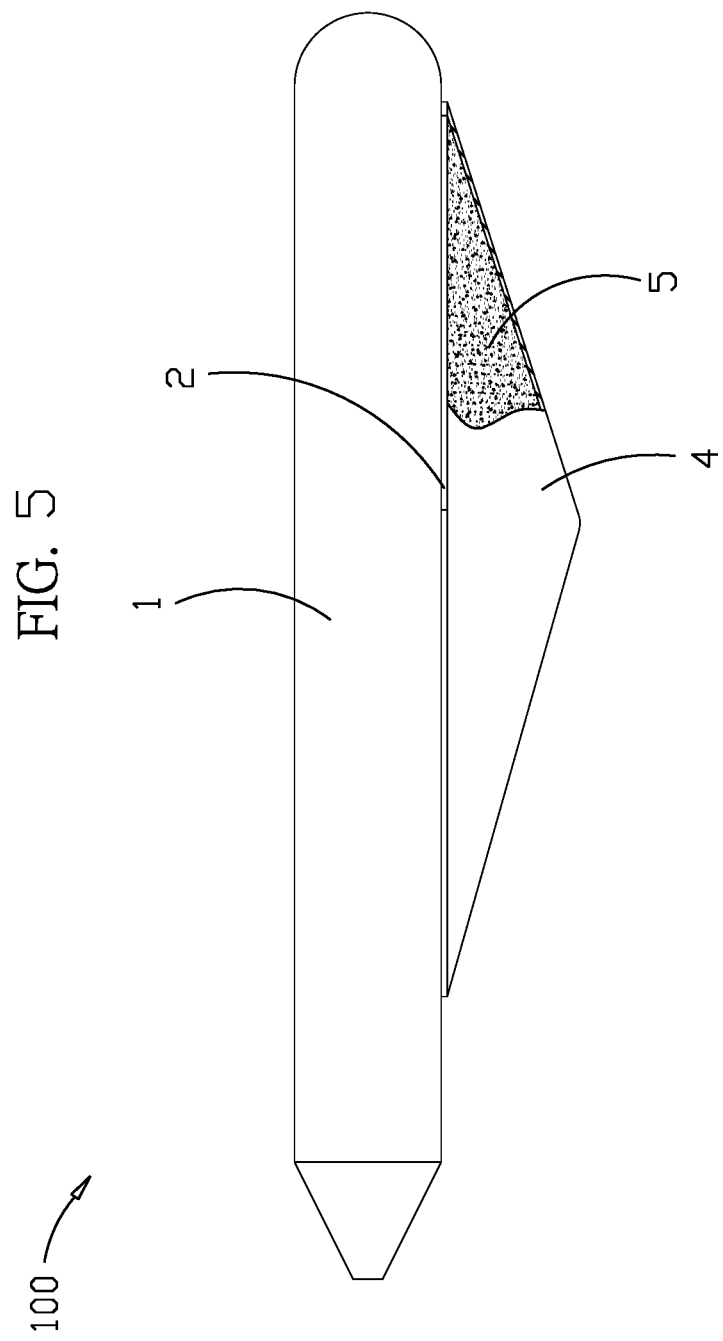

BOAT WITH A FOAM MATERIAL FILLED KEEL STRUCTURE

TECHNICAL FIELD

The present invention relates to improvement in a boat with a foam filled keel structure; particularly to a boat with a foam filled keel structure, wherein a keel structure is set on the bottom of a buoyant body.

BACKGROUND ART

A rubber boat or a boat with foam material has the advantage of lightness. Furthermore, a boat filled with foam material has high strength and high load bearing, hence they are widely applied to lifeboat, transport boast, fishing boats and so on.

A conventional foam material filled boat has a keel structure on the bottom which supports a buoyant body of the boat, thereby bending of the buoyant body is avoided. The keel structure is downward depressed, hence a convex part and a groove are formed.

One of the purposes of building a groove in the keel structure is to reduce weight. Anyway, after the keel structure is set on the bottom of the bottom plate, the bottom plate can close the groove of the keel structure to build a closed space. Thereby buoyancy of the boat is also improved.

However, since the convex part of the keel structure lies under water, it can become damaged accidentally. If the keel structure becomes damaged accidentally, water will seep in the keel structure, so that buoyancy of the boat is impaired.

In view of these disadvantages the inventor tried the continuous testing and improvement and developed the present invention.

SUMMARY OF THE INVENTION

The main object of the present invention is to provide a boat with a foam filled keel structure, wherein the keel structure is free from water seepage.

For achieving above object, the present invention comprises: a buoyant body, which is a U-shaped tube; a bottom plate, set on the bottom of the buoyant body; a tail plate; set at the rear of the buoyant body and the bottom plate; and a keel structure, set on the bottom of the bottom plate; wherein the keel structure is downward depressed, hence a convex part on the bottom and a groove at the top are formed; wherein the keel structure is filled with foam material.

Preferably, the bottom plate has at least an infusion mouth for injecting foam material into the groove of the keel structure.

Preferably, the keel structure is made of hard and elastic composite material, for reducing weight and increasing strength.

Preferably, the keel structure is made of polymer fiberboard or fiber reinforced plastic (FRP) for reducing weight and increasing strength.

Preferably, the foam material is foaming polymer material of low specific gravity for reducing weight.

Preferably, the foam material is foaming synthetic resin material like polyurethane or ethylene/vinyl acetate copolymer (EVA) for reducing total weight.

Other aspects and advantages of the present invention will become apparent from the following detailed description, taken in conjunction with the accompanying drawing, illustrating by way of example the principles of the present invention.

BRIEF DESCRIPTION OF THE DRAWINGS

FIG. 5. is sectional view after foam material is injected.

DETAILED DESCRIPTION OF PREFERRED EMBODIMENTS

Figure 1:
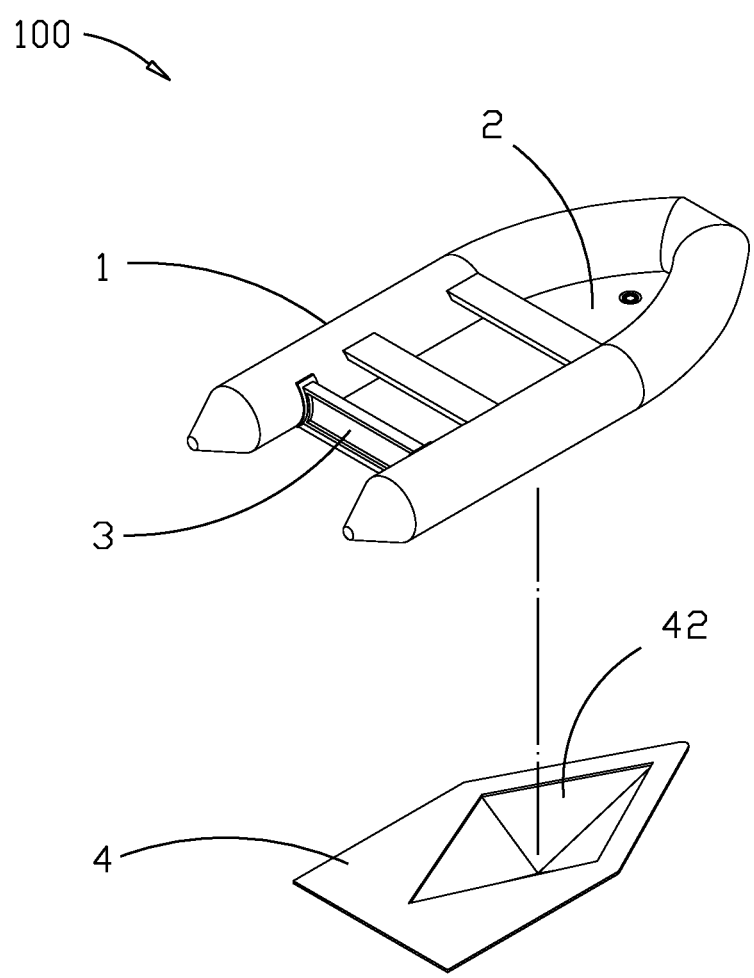
FIG. 1. is an exploded view of the present invention before foam material is injected.

As shown in FIG. 1-5, the present invention a boat with a foam filled keel structure comprises: a buoyant body 1, which is an U-shaped tube; a bottom plate 2, set on the bottom of the buoyant body 1, a tail plate 3, set at the rear of the buoyant body 1 and the bottom plate 2; and a keel structure 4, set on the bottom of the bottom plate 2; wherein the keel structure, having a convex part 41 on the bottom and a groove 42 at the top, is downward depressed; wherein the groove 42 of the structure 4 is filled with foam material 5. Thereby it is achieved that water seepage in the keel structure is avoided.

As shown in FIG. 1-4, the groove 42 of the keel structure 4 is filled with foam material. FIG. 5 shows the groove 42 of the keel structure 4 after the foam material is filled.

The buoyant body 1, the bottom plate 2 and the tail bottom 3 constitute a strong buoyant structure, which can be applied to e.g. carrying people or wares.

Figure 2:
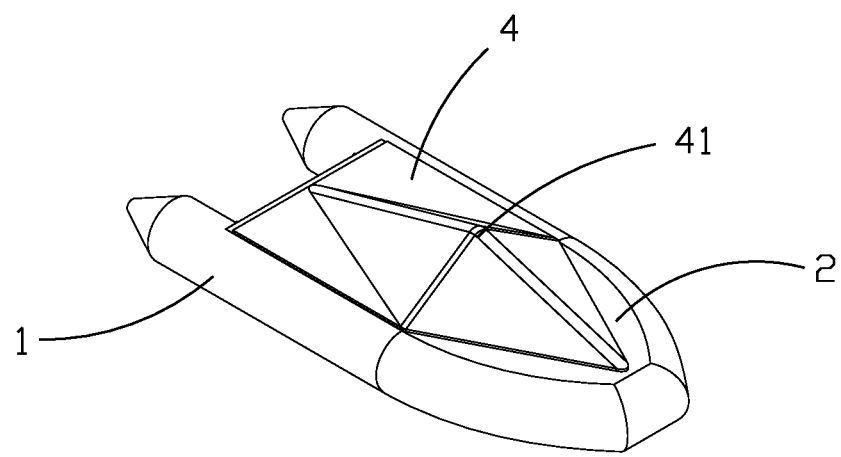
FIG. 2. is a three-dimensional view of the present invention from the bottom, before foam material is injected.

As shown in FIG. 2, the keel structure 4 is fixed on the bottom of the bottom plate 2, e.g. by hot melting. The keel structure 4 is made of rubber material, or made of polymer fiberboard or fiber reinforced plastic (FRP), such hard and elastic composite material, for reducing weight and increasing strength.

The keel structure 4 is downward depressed, hence a convex part 41 on the bottom and a groove 42 at the top are formed. The convex part 41 can have various shapes, e.g. the keel structure 4 is downward depressed like a quadrangular pyramid to support the buoyant body 1, whereby bending of the buoyant body 1 is avoided. Hence, it functions like a keel of a boat for supporting. Besides, when a boat is moving forward, the convex part 41 of the keel structure 4 is breaking water to reduce resistance, thereby the function of wave breaking is improved. Furthermore, if waves surge from sides of the boat, the waves are broken through the keel structure, thereby wave impact is reduced and wave adaptivity is improved.

Figure 3:
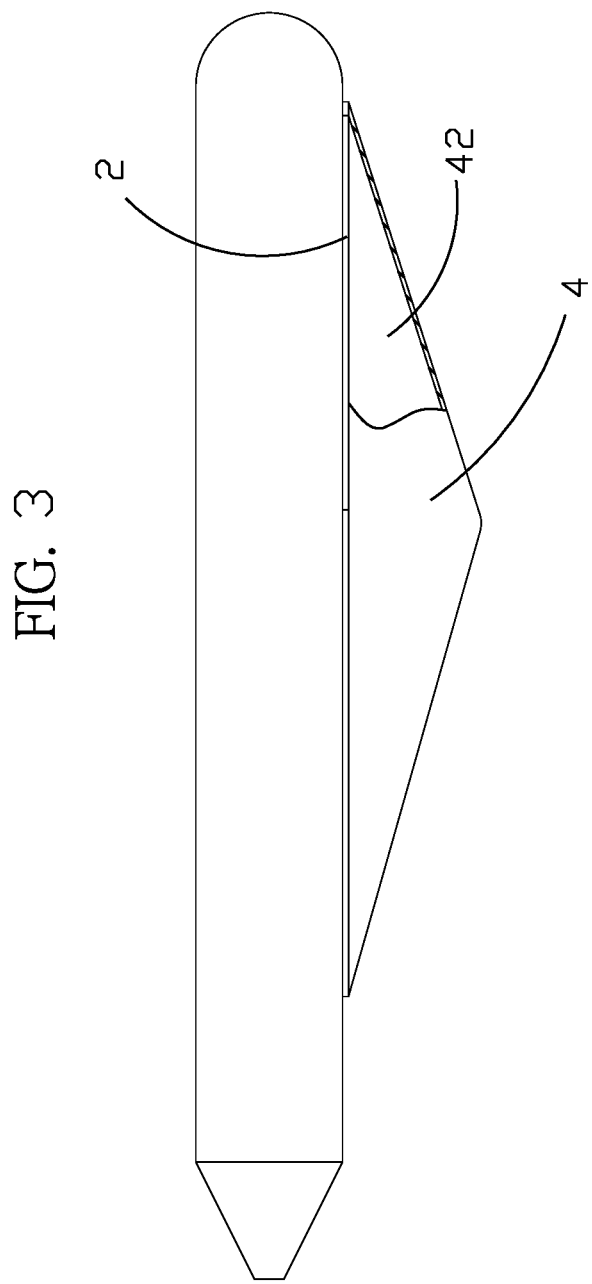
FIG. 3. is a sectional view of the keel structure before foam material is injected.

As shown in FIG. 3, as soon as the keel structure 4 is set on the bottom of the bottom plate 2, the groove 42 of the keel structure 4 is closed by the bottom plate 2, thereby a closed space is built up. The main purpose thereof is to support the buoyant body 1 by the keel structure 4, while the purpose of building a groove 42 at the top of the keel structure 4 is to reduce weight.

Figure 4:
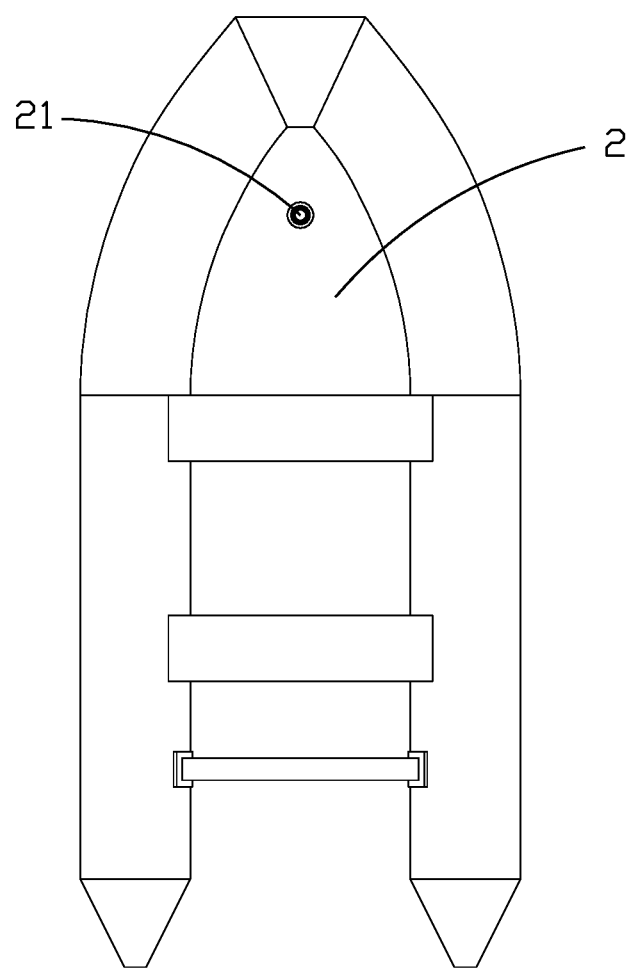
FIG. 4. is a top view of the present invention before foam material is injected.

As shown in FIG. 4-5, on the bottom plate 2 there is an infusion mouth 21, by which foam material is injected into the groove of the keel structure. The foam material 5 is foaming polymer material of low specific gravity, e.g. foaming synthetic resin material like polyurethane or ethylene/vinyl acetate copolymer (EVA).

When the groove 42 of the keel structure is filled with the foam material 5, not only almost no weight is increased, but the groove 42 of the keel structure is filled also, thereby water seepage in the keel structure 4 is avoided. Even if the keel structure is damaged, trouble with water seepage in the groove 42 of the keel structure is eliminated.

While preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

The invention claimed is:

1. A boat with a foam material filled keel structure, comprises:
    a buoyant body, which is a U-shaped tube;
    a bottom plate, set on a bottom of the buoyant body;
    a tail plate, set at a rear of the buoyant body and the bottom plate; and
    a keel structure, set on a bottom of the bottom plate;
        wherein the keel structure is downward depressed, hence a convex part at the bottom and a groove at a top are formed; wherein the groove of the keel structure is filled with foam material.

2. The boat with a foam material filled keel structure of claim 1, wherein the bottom plate has at least an infusion mouth, to inject the foam material into the groove of the keel structure.

3. The boat with a foam material filled keel structure of claim 1, wherein the keel structure is made of elastic composite material.

4. The boat with a foam material filled keel structure of claim 3, wherein the keel structure is made of polymer fiberboard or fiber reinforced plastic (FRP).

5. The boat with a foam material filled keel structure of claim 3, wherein the foam material is foaming polymer material.

6. The boat with a foam material filled keel structure of claim 5, wherein the foam material is polyurethane or ethylene/vinyl acetate copolymer (EVA).

* * * * *